United States Patent
Denicia et al.

(10) Patent No.: US 12,536,853 B2
(45) Date of Patent: Jan. 27, 2026

(54) TOWING DIAGNOSTIC SYSTEM

(71) Applicant: Ford Global Technologies, LLC, Dearborn, MI (US)

(72) Inventors: Enrique Denicia, Miguel Hidalgo (MX); Juan Pablo Esquivel, Cuautitlan (MX); Jose Uriel Hernandez, Mexico City (MX); Jose Ruben Cadena Martinez, Tultitlan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 18/775,309

(22) Filed: Jul. 17, 2024

(65) Prior Publication Data
US 2026/0024386 A1    Jan. 22, 2026

(51) Int. Cl.
*G07C 5/08*     (2006.01)
*G01R 31/00*    (2006.01)

(52) U.S. Cl.
CPC ......... *G07C 5/0825* (2013.01); *G01R 31/007* (2013.01); *G07C 5/085* (2013.01)

(58) Field of Classification Search
CPC .... G07C 5/0825; G07C 5/085; G01R 31/007; B60D 1/00; B60D 1/01; B60D 1/07; H01R 13/00; H01R 13/62
See application file for complete search history.

(56) References Cited

U.S. PATENT DOCUMENTS

| | | | |
|---|---|---|---|
| 6,043,661 A * | 3/2000 | Gutierrez | G01L 5/28 324/504 |
| 9,069,026 B1 | 6/2015 | Rutkowsky | |
| 9,501,877 B2 * | 11/2016 | Andrus | G07C 5/0808 |
| 10,068,393 B2 * | 9/2018 | Andrus | G07C 5/0808 |
| 10,388,161 B2 | 8/2019 | Troutman et al. | |
| 12,448,989 B2 * | 10/2025 | Lubben | F15B 1/04 |
| 2014/0015657 A1 * | 1/2014 | Hanson | B60Q 1/26 340/431 |
| 2017/0116795 A1 * | 4/2017 | Andrus | G07C 5/0808 |
| 2018/0050704 A1 | 2/2018 | Tascione et al. | |
| 2018/0197354 A1 | 7/2018 | Remboski et al. | |
| 2019/0299861 A1 * | 10/2019 | Weigert | B60Q 1/2661 |
| 2020/0122715 A1 * | 4/2020 | Layfield | B60K 1/04 |

(Continued)

FOREIGN PATENT DOCUMENTS

DE    202019002114 U1    7/2019

*Primary Examiner* — Ashley L Redhead, Jr.
(74) *Attorney, Agent, or Firm* — Frank Lollo; Price Heneveld LLP

(57) ABSTRACT

A towing diagnostic system includes a detection circuit on a towing vehicle, a load circuit including at least one electrical load corresponding to an electrical circuit of a towed vehicle, an electrical interface at the towing vehicle providing electrical communication between the load circuit and the detection circuit, and a user interface configured to display a plot including load information about the load circuit. The detection circuit includes control circuitry in communication with the user interface and the load circuit. The control circuitry is configured to communicate a test signal to the load circuit, measure a response to the test signal from the load circuit, determine the load information based on the response to the test signal, and communicate an output to the user interface to present the plot.

18 Claims, 4 Drawing Sheets

(56) References Cited

U.S. PATENT DOCUMENTS

| | | |
|---|---|---|
| 2020/0298757 A1 | 9/2020 | Thompson et al. |
| 2021/0013660 A1* | 1/2021 | Markefka .............. H01R 13/42 |
| 2021/0354521 A1 | 11/2021 | Slade et al. |
| 2021/0380086 A1 | 12/2021 | Albright et al. |
| 2022/0147742 A1* | 5/2022 | El-sawah ............. G06N 3/0464 |
| 2022/0187099 A1* | 6/2022 | Tiede .................... B60B 7/0013 |
| 2023/0041140 A1 | 2/2023 | Bean et al. |
| 2023/0182518 A1 | 6/2023 | Pampattiwar et al. |
| 2023/0265864 A1* | 8/2023 | Lubben .................. B62D 12/02 |
| | | 280/421 |
| 2023/0339455 A1* | 10/2023 | Weston ................ B60W 40/114 |
| 2024/0131887 A1* | 4/2024 | Avalos Ponce .......... B60D 1/64 |
| 2024/0321020 A1* | 9/2024 | Alba ...................... G07C 5/008 |
| 2025/0256668 A1* | 8/2025 | DiNardo ................ H02J 1/086 |

\* cited by examiner

TOWING DIAGNOSTIC SYSTEM

FIELD OF THE DISCLOSURE

The present disclosure generally relates to a towing diagnostic system and, more particularly, a system for checking electrical connectivity and signaling for a vehicle.

BACKGROUND OF THE DISCLOSURE

Conventional tow connection testing equipment can be limited in functionality and feedback.

SUMMARY OF THE DISCLOSURE

According to a first aspect of the present disclosure, a towing diagnostic system includes a detection circuit on a towing vehicle, a load circuit including at least one electrical load corresponding to an electrical circuit of a towed vehicle, an electrical interface at the towing vehicle providing electrical communication between the load circuit and the detection circuit, and a user interface configured to display a plot including load information about the load circuit. The detection circuit includes control circuitry in communication with the user interface and the load circuit. The control circuitry is configured to communicate a test signal to the load circuit, measure a response to the test signal from the load circuit, determine the load information based on the response to the test signal, and communicate an output to the user interface to present the plot.

Embodiments of the first aspect of the present disclosure can include any one or a combination of the following features:
- the plot includes electrical characteristic data measured over time;
- the electrical characteristic data includes an on state current through the load circuit;
- the towing diagnostic includes a tester configured to plug into the electrical interface, wherein the load circuit is disposed in the tester;
- the tester includes at least one electromagnet to simulate a trailer brake;
- the tester includes at least one lighting device to simulate a trailer light, the control circuitry is configured to compare the response to target response data, and determine compatibility of the electrical circuit based on the comparison.
- the control circuitry is configured to communicate the compatibility to the user interface, and wherein the user interface is configured to indicate the compatibility;
- the towing diagnostic includes a database configured to store properties of the electrical circuit of the towed vehicle, wherein the control circuitry is configured to communicate the properties of the electrical circuit of the towed vehicle in response to the electrical circuit being compatible; and
- the user interface is configured to display a pulse-width modulation signal representative of the test signal.

According to a second aspect of the present disclosure, a towing diagnostic system includes a detection circuit on a towing vehicle, a load circuit including at least one electrical load corresponding to an electrical circuit of a towed vehicle, an electrical interface at the towing vehicle providing electrical communication between the load circuit and the detection circuit, and a user interface configured to display a plot including load information about the load circuit. The plot includes electrical characteristic data measured over time. The detection circuit includes control circuitry in communication with the user interface and the load circuit. The control circuitry is configured to communicate a test signal to the load circuit, measure a response to the test signal from the load circuit, determine the load information based on the response to the test signal, and communicate an output to the user interface to present the plot.

Embodiments of the second aspect of the present disclosure can include any one or a combination of the following features:
- the user interface is configured to display a pulse-width modulation signal representative of the test signal;
- the electrical characteristic data includes an on state current through the load circuit;
- the towing diagnostic system includes a tester configured to plug into the electrical interface, wherein the load circuit is disposed in the tester;
- the tester includes at least one electromagnet to simulate a trailer brake;
- the tester includes at least one lighting device to simulate a trailer light;
- the control circuitry is configured to compare the response to target response data, and determine compatibility of the electrical circuit based on the comparison;
- the control circuitry is configured to communicate the compatibility to the user interface, and wherein the user interface is configured to indicate the compatibility; and
- the towing diagnostic system includes a database configured to store properties of the electrical circuit of the towed vehicle, wherein the control circuitry is configured to communicate the properties of the electrical circuit of the towed vehicle in response to the electrical circuit is compatible.

According to a second aspect of the present disclosure, a towing diagnostic system includes a detection circuit on a towing vehicle, a load circuit including at least one electrical load corresponding to an electrical circuit of a towed vehicle, an electrical interface at the towing vehicle providing electrical communication between the load circuit and the detection circuit, a tester configured to plug into the electrical interface. The load circuit is disposed in the tester. A user interface is configured to display a plot including load information about the load circuit. The plot includes electrical characteristic data measured over time. The detection circuit includes control circuitry in communication with the user interface and the load circuit. The control circuitry is configured to communicate a test signal to the load circuit, measure a response to the test signal from the load circuit, determine the load information based on the response to the test signal, and communicate an output to the user interface to present the plot.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
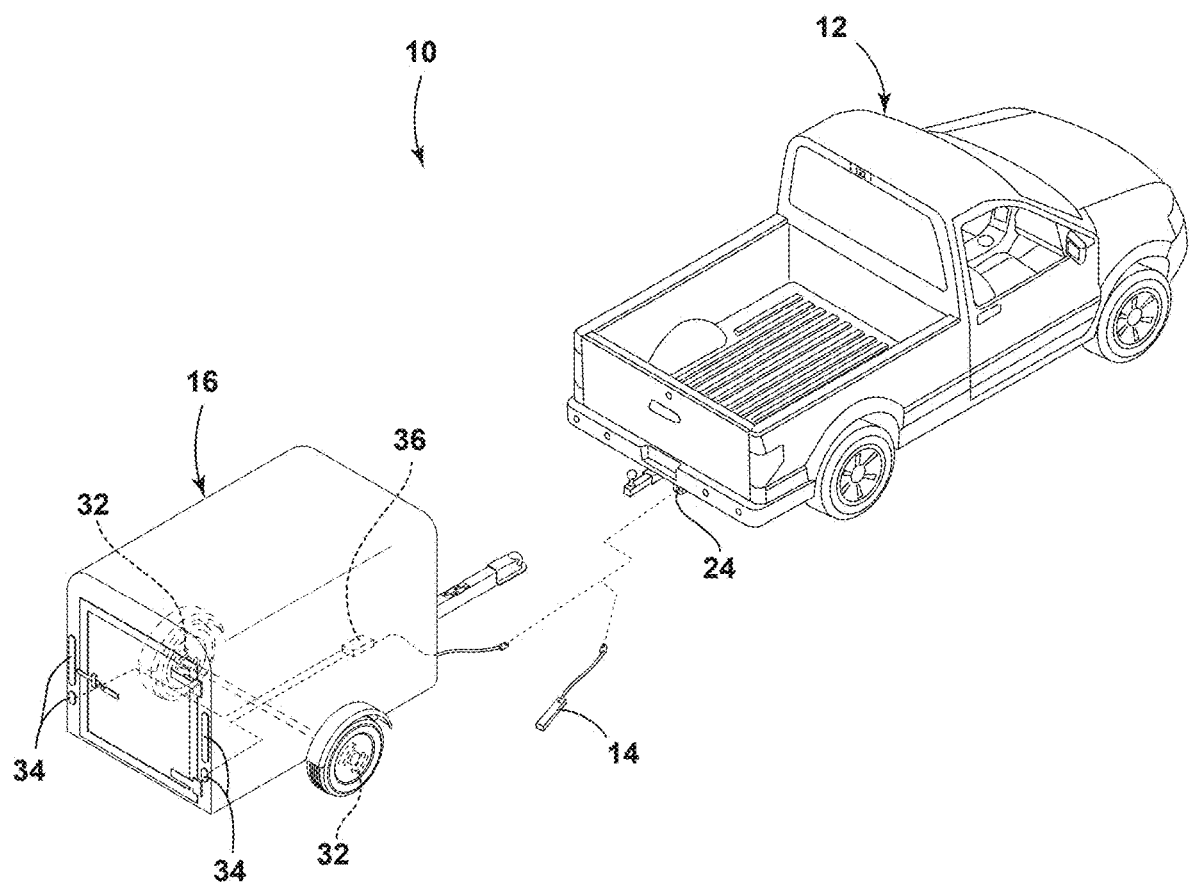
FIG. 1 is a side perspective view of a vehicle arrangement utilizing a towing diagnostic system according to one aspect of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

The present illustrated embodiments reside primarily in combinations of method steps and apparatus components related to a towing diagnostic system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-3B, a towing diagnostic system is generally designated at 10. The towing diagnostic system 10 can generally provide for enhanced diagnostics and testing of signal connections and communication for a towing vehicle 12. The system 10 can utilize a tester 14, or a towed vehicle 16 connected to the towing vehicle 12 to perform at least a part of the various diagnostic measures. The system 10 generally provides for enhanced user engagement and diagnostics by providing electrical load information and classification outcomes. Thus, a dynamic solution may be provided by the towing diagnostic system 10.

Referring generally with continued reference to FIGS. 1-3B, a towing diagnostic system 10 includes a detection circuit 18 on a towing vehicle 12 and a load circuit 20 including at least one electrical load 22 corresponding to an electrical circuit of a towed vehicle 16. The towing diagnostic system 10 further includes an electrical interface 24 at the towing vehicle 12 providing electrical communication between the load circuit 20 and the detection circuit 18. The towing diagnostic system 10 further includes a user interface 26 configured to display 40 a plot 28 including load information about the load circuit 20. The detection circuit 18 includes control circuitry 30 in communication with the user interface 26 and the load circuit 20. The control circuitry 30 is configured to communicate a test signal to the load circuit 20, measure a response to the test signal from the load circuit 20, determine the load information based on the response to the test signal, and communicate an output to the user interface 26 to present the plot.

It is contemplated that the plot 28 displayed by the user interface 26 can present electrical characteristic data measured over time. The electrical characteristic data can include electrical current, electrical voltage, resistance, capacitance, inductance, or any other electrical characteristic. In some examples, the electrical characteristic data includes an ON-state current through the load circuit 20. For example, the plot 28 can present a spike or a change in electrical current corresponding to the load circuit 20 being energized.

The load circuit 20 can include any electrical load that can be powered via electrical signals from the electrical interface 24 at the towing vehicle 12. For example, the load circuit 20 can include brakes 32, lights 34, controllers, power sources 36, or any other electrical device. The load circuit 20 may be located in the towed vehicle 16, such as a trailer, and/or in the tester 14. For example, the tester 14 can include various electrical components utilized to simulate electrical loads 22 of the towed vehicle 16. It is contemplated that a plurality of towed vehicles 16 may be operable with the electrical interface 24, such that some makes and/or models of towed vehicles 16 may allow functional connection with the towed vehicles 16 while others may not. The tester 14 can be configured to test signaling from the detection circuit 18 and/or the control circuitry 30 for towed vehicles 16 that are compatible with the system 10. For example, the system 10 can store electrical information including a compatible range of current voltage or the like that can be used to detect whether a trailer model is operable with the towing vehicle 12.

It is further contemplated that the control circuitry 30 can compare the response to target response data and determine compatibility of the electrical circuit based on the comparison. By way of example, different brakes 32 may be utilized for different makes/models of towed vehicles. Certain makes/models may not be operable with the towing vehicle 12. Accordingly, the control circuitry 30 can determine whether such towed vehicle 16 is compatible with the towing vehicle 12 using the load data. Accordingly, the towing diagnostic system 10 can be utilized to determine user error and/or limit compatibility issues by assigning the load circuit 20 with a compatibility level or score (e.g., compatible, or incompatible). The compatibility can be communicated to the user interface 26 by the control circuitry 30, and the user interface 26 can indicate the compatibility. In some examples, a database 46 is configured to store properties of the electrical circuit of the towed vehicle 16, and the control circuitry 30 is configured to communicate the properties of the electrical circuit of the towed vehicle 16 in response to the electrical circuit being compatible. For example, the tester 14 can simulate compatible models/makes of towed vehicles 16 and, for example, the database 46 can store a plurality of electrical characteristics corresponding to the compatible towed vehicles 16. The control circuitry 30 can compare the electrical properties detected by the detection circuit 18 to the database 46 to determine compatibility. As will be described further herein, the user interface 26 can communicate this compatibility to the user via the user interface 26.

Referring now to FIG. 1, the load circuit 20 is demonstrated incorporated into each of the tester 14 and the towed vehicle 16. In the present example, the towing device is a trailer having a plurality of electrical loads. The plurality of electrical loads 22 can be part of the load circuit 20 and include trailer lights, trailer brakes 32, and a power source 36 (e.g., a battery). The tester 14 can incorporate similar circuitry to the load circuitry 20 of the towed vehicle 16. In this example, the towing vehicle 12 is demonstrated as a truck, but any other vehicle employing the present towing diagnostic system 10 may be employed.

As depicted, the tester 14 can include a housing and one or more switches or display 40 for controller of the tester. The electrical circuit in the tester 14 can incorporate electrical components that can simulate the lights 34, brakes 32, power source 36, and the like. The tester 14 can also be configured to indicate compatibility by energizing the indicators. As shown, the tester 14 can also include a cable for connecting to the electrical interface 24. The towing vehicle 12 can include the detection circuit 18. The detection module 38 can have a one or more electrical conductors 39 that extend between the detection module 38 and the electrical interface 24 at a rear of the vehicle. For example, the electrical interface 24 can include a plug or other electrical connector (e.g., male or female) that allows for receiving or engaging the cables from towed vehicle 16 or the tester 14.

When the tester 14 or the towed vehicle 16 are electrically connected with the detection circuit 18 via the electrical interface 24, the detection circuit 18 can be in electrical communication with the load circuit 20 and allow control circuitry 30 to initiate diagnostics for controlling the lights 34, the brakes 32, or another electrical load.

While the load circuit 20 in the tester 14 may be similar to the load circuit 20 in the towed vehicle 16, is contemplated that the electrical components in the tester 14 may be universal for all compatible models of the towed vehicle 16. For example, the tester 14 can include the indicator lights that are representative of the lights 34 (e.g., the brake lights, turn signal lights, or other lights) typically located on a trailer. The brakes 32 may be simulated by the tester 14 by using electromagnetic devices, such as solenoids, the lights 34 can be simulated by light-emitting diodes (LEDs), resistors, and/or incandescent bulbs, etc. Thus, while the electrical components may differ from those used in the towed vehicle 16, a base set, or standard, can be used for comparison to the response signal(s).

Figure 2:
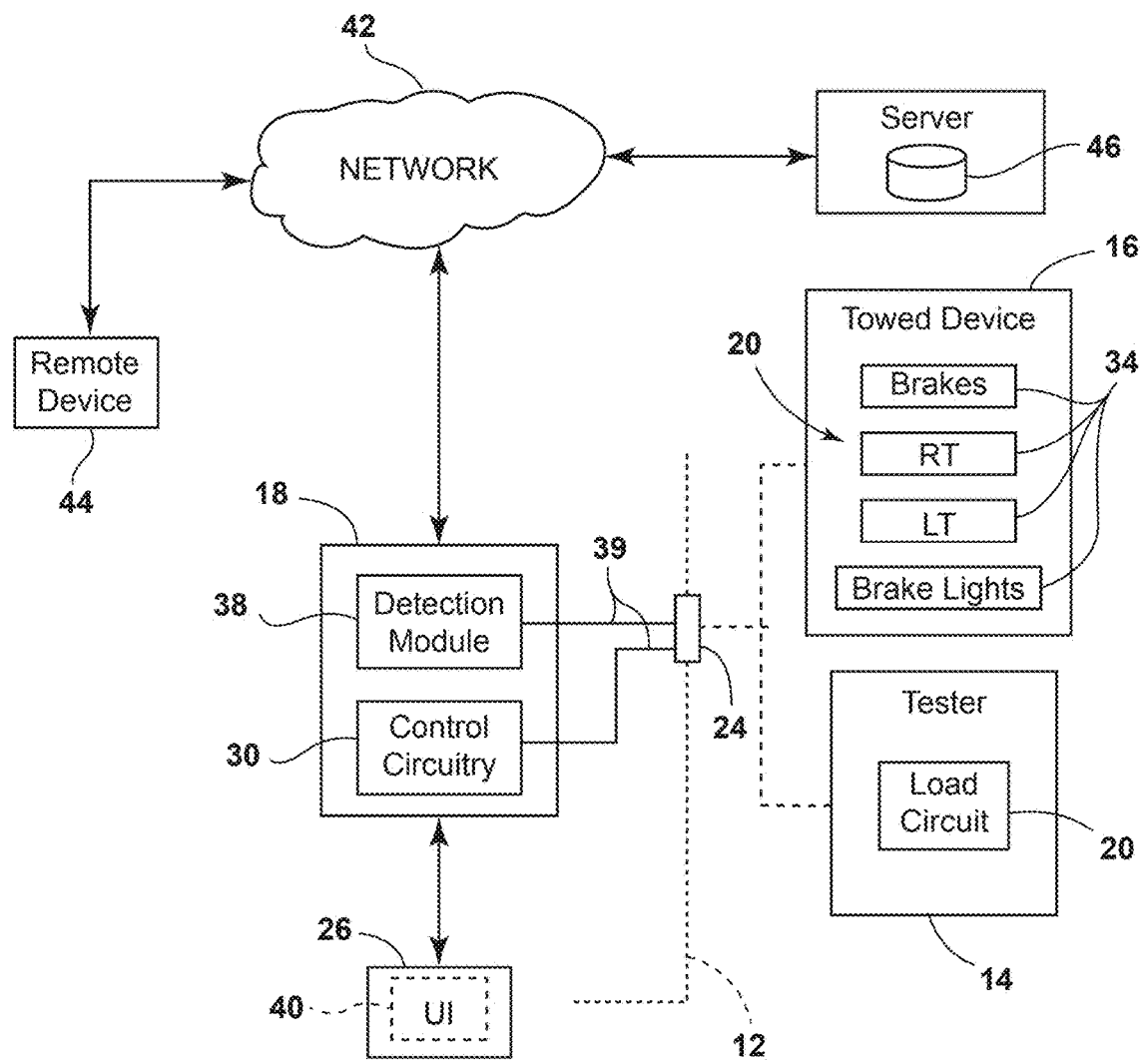
FIG. 2 is a functional block diagram of the towing diagnostic system.

Referring now to FIG. 2, the detection circuit 18 can include a detection module 38 in communication with the control circuitry 30, which each may be coupled with the load circuit 20, either in the tester 14 or in the towed vehicle 16. For example, internal wiring may be provided in the towing vehicle 12 to connect the detection circuit 18 with the electrical interface 24. The detection circuit 18 can include a controller that has a processor and a memory. The memory can store instructions that, when executed by the processor, cause the controller to communicate signals to the load circuit 20. The controller can be at least a part of the detection module 38 and/or the control circuitry 30. It is contemplated that the detection circuit 18 can include a plurality of controllers, or alternatively, be in communication with additional controllers, such as an ABS controller or another braking system controller of the towed vehicle 16. For example, the detection circuit 18 can be configured to communicate power and/or communication signals to the electrical interface 24 in response to receiving braking commands from a braking controller. Accordingly, the detection circuit 18 can include any circuitry for controlling communication of brake signals, lighting signals, charging signals, or any other signal for exchange with the load circuit 20.

With continued reference to FIG. 2, the user interface 26 can be in communication with the detection circuit 18 and be configured to present information related to the electrical characteristics detected by the detection circuit 18. The detection circuit 18 can be controlled by a user via the user interface 26. For example, as will be described further in reference to FIGS. 3A and 3B, the user can initiate testing routines via interaction with a display 40 of the user interface 26 that causes the detection circuit 18 to communicate the test signals to the load circuit 20. The detection circuit 18 can further be in communication with a wireless network. For example, a communication interface can allow for wave radio communications, including Wi-Fi®, Bluetooth®, Zigbee®, or any other wireless communication protocol. While demonstrated as a wireless network, the network 42 can include wired communication devices in the towing vehicle 12. For example, the user interface 26 and the detection circuit 18 may be in wired communication via TCP/IP, Ethernet, USB, or any other communication protocol. However, in some examples, remote devices 44, such as mobile devices, can wirelessly access the wireless network 42 to access the detection circuit 18 and initiate the testing routines remotely. Thus, a vehicle HMI or a remote mobile device with access to the wireless network 42 can be used to operate the detection circuit 18.

The database 46, while demonstrated as remote from the detection circuit 18, may be local to the vehicle in other examples. In the present example, the remote database 46 stores data of valid and/or compatible towing devices that can interact with the detection circuit 18 accurately. The database 46 can be updated based on test results from the detection circuit 18. For example, the database 46 can store from new models of the trailers that, while previously not known to be compatible, can be added as compatible and stored accordingly. Other users may have access to the database 46 via access to separate wireless network. In this way, the data in the database 46 can be updated from use of other testers assigned to other users. While demonstrated as being incorporated into the remote database 46, it is contemplated that the compatible trailer makes/models may be stored locally in the memory of the detection module 38 and/or another memory of the detection circuit 18.

Still referring to FIG. 2, the load circuit 20 can include electrical loads typically provided in the towing device. For example, a left-turn light, a right-turn light 34, other lights 34, brake lights 34, battery, circuitry, or the like may be provided in the load circuit 20. Accordingly, the tester 14 may include electromagnets to simulate the brakes 32, LEDs and/or resistors to simulate lighting, or the like. It is contemplated that the load circuit 20 provided in the tester 14 can be applicable to a plurality of operable trailer makes and models. For example, the electrical loads 22 can represent an average, median, or other statistical property of values in a list of compatible electrical values (e.g., resistances, voltages, etc.).

During testing, the detection circuit 18 can communicate the test signals to the load circuit 20 via the electrical interface 24. In the case of the load circuit 20 being in the towed vehicle 16 and connected to the towing vehicle 12, the detection circuit 18 can measure a response from the load circuit 20 of the towed vehicle 16. For example, power draw, voltage, current fluctuations, induction readings, capacitance readings, or the like can be measured by the detection circuit 18 to classify the towed vehicle 16 as compatible or incompatible. For example, the detection circuit 18 can include an operable range of resistance values or an operable range of current load values. In response to pulse width modulated signals, various flashing routines or actuation routines can be performed on the load circuit 20 of the towed vehicle 16. In response to a response signal from the test signal, the detection circuit 18 can classify the model of the towing vehicle 12. For example, some trailers may incorporate brakes 32 while other towed vehicle 16 may not have brakes 32. Accordingly, the testing can result in classification of the towed vehicle 16. Other, more fine-tuned classifications can occur, such as detection of a particular lighting utilized by the towed vehicle 16. For example, lighting light-emitting diodes, incandescent lamps, or the like can be differentiated based on electrical properties.

Figure 3A:
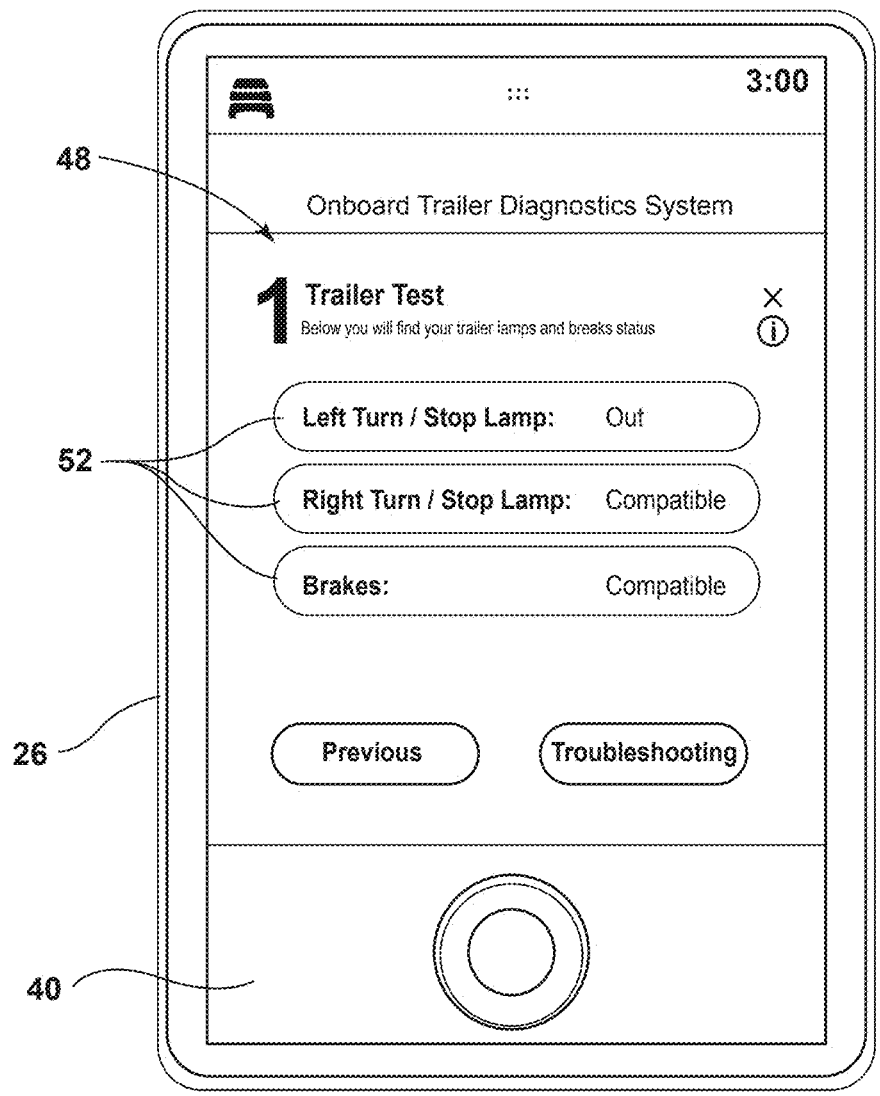
FIG. 3A is a front plan view of a user interface of the towing diagnostic system presenting a user test screen.
Figure 3B:
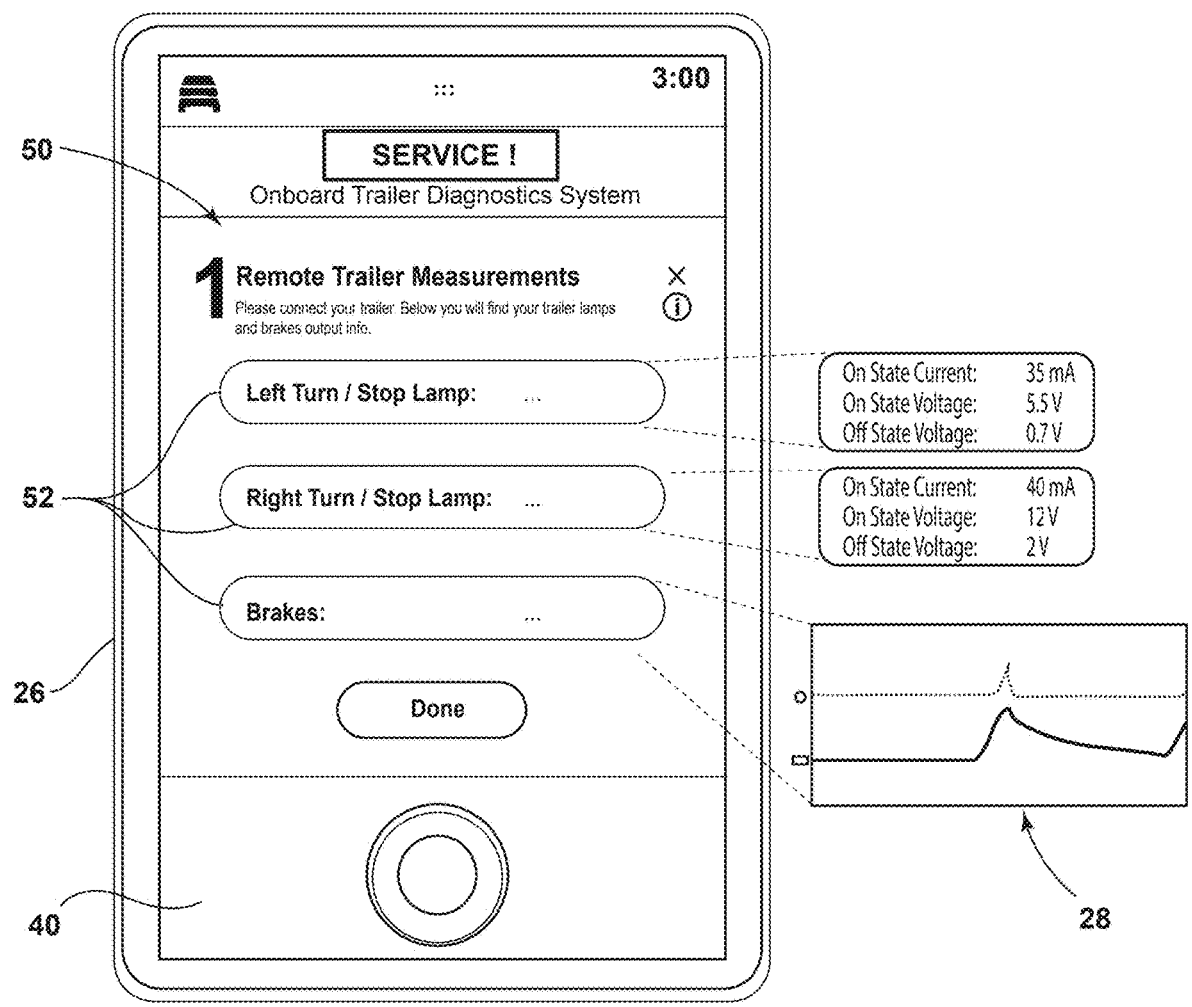
FIG. 3B is a front plan view of the user interface presenting a technician test screen.

Referring now to FIGS. 3A and 3B, the user interface 26 can be configured to present a plurality of screens 48, 50, such as the first screen 48 (FIG. 3A) and the second screen 50 (FIG. 3B). In general, the user interface 26 can be a human-machine interface HMI of the vehicle or a mobile device of the user. For example, the user interface 26 may be a phone remote from the vehicle for testing the load circuit 20. In some examples, the system 10 can be utilized to perform remote tests (FIG. 3A) or local tests (FIG. 3A). For example, a user can connect the trailer to the towing vehicle 12 at or remote from a technician facility. Alternatively, a trailer may be remote from a testing facility, and the towing vehicle 12 may be tested via the tester 14. For example, a technician at the technician center can plug in the tester 14 and test the signaling of the towing vehicle 12 via the load circuit 20 in the tester 14.

Referring specifically to FIG. 3A, the first screen 48 can include various objects 52 for performing user tests on the towed vehicle 16 or the tester 14. For example, the lights 34 can be tested and confirmed as operable or inoperable in response to the test signal. In this way, a user can test the operability of the towed vehicle 16. However, in the event that an outage or interoperability is detected by the system 10, an error source may be determined by the system 10 using the trailer tester 14. For example, as demonstrated in FIG. 3B, detailed electrical characteristic information can be determined by the detection circuit 18 and compared to the threshold information to determine an error mode. For example, the towed vehicle 16 may have broken lights 34 or brakes 32. In this case, the user test operable from the first screen 48 can allow the user to diagnose the error as an error of the towing vehicle 12. However, in the event that the user suspects an error of the controller, a service technician can test signaling of the controller/the detection circuit 18 by plugging in the tester 14 and testing operability of signaling within the towing vehicle 12. In this way, the system 10 can provide for enhanced diagnostics and error source detection. For example, if the system 10 determines operability of the signaling to the electrical interface 24, or using the tester 14, the towing vehicle 12 or the towed vehicle 16 may be diagnosed as the source of the error. The source of the error can further be refined and categorized by the system 10 by classifying the electrical characteristics read from testing the load circuit 20 of the towed vehicle 16.

As demonstrated in FIG. 3B, a plot 28 of electrical characteristics for the brake 32 can include test signals and detection of the test signals. For example, the test signal can be a pulse width modulated signal of electrical current and/or electrical voltage communicated to the load circuit 20. In response, a voltage or current can be read by the detection circuit 18. A magnitude or polarity of the voltage or current can be monitored and stored in the database 46 (FIG. 2). In this way, operability of the towing vehicle 12 can be classified. In this way, data can be gathered regarding common and operable trailers that are used with the system 10. It is also contemplated that electrical characteristic ranges can be tracked and identified by the system 10, as indicated in the information presented at first and second objects 52 presented in FIG. 3B.

It is contemplated that the menu presented in FIG. 3B, in some examples, can only be accessible via technician (e.g., a debug menu), whereas the menu presented FIG. 3A can be accessed by the user or customer for testing operable connection of the brakes 32 and lights 34 of the towed vehicle 16.

In general, the system 10 allows for diagnostics detection, and classification using electrical characteristics of a towed vehicle 16 and/or a remote tester 14.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A towing diagnostic system, comprising:
    a detection circuit on a towing vehicle;
    a load circuit including at least one electrical load corresponding to an electrical circuit of a towed vehicle;
    an electrical interface at the towing vehicle providing electrical communication between the load circuit and the detection circuit; and
    a user interface configured to display a plot including load information about the load circuit, wherein the detection circuit includes control circuitry in communication with the user interface and the load circuit, the control circuitry configured to:
        communicate a test signal to the load circuit;
        measure a response to the test signal from the load circuit;
        determine the load information based on the response to the test signal;
        communicate an output to the user interface to present the plot;
        compare the response to target response data; and
        determine compatibility of the electrical circuit based on the comparison.

2. The towing diagnostic system of claim 1, wherein the plot includes electrical characteristic data measured over time.

3. The towing diagnostic system of claim 2, wherein the electrical characteristic data includes an on state current through the load circuit.

4. The towing diagnostic system of claim 1, further comprising:
    a tester configured to plug into the electrical interface, wherein the load circuit is disposed in the tester.

5. The towing diagnostic system of claim 4, wherein the tester includes at least one electromagnet to simulate a trailer brake.

6. The towing diagnostic system of claim 4, wherein the tester includes at least one lighting device to simulate a trailer light.

7. The towing diagnostic system of claim 1, wherein the control circuitry is configured to communicate the compatibility to the user interface, and wherein the user interface is configured to indicate the compatibility.

8. The towing diagnostic system of claim 7, further comprising:
    a database configured to store properties of the electrical circuit of the towed vehicle, wherein the control circuitry is configured to communicate the properties of the electrical circuit of the towed vehicle in response to the electrical circuit being compatible.

9. The towing diagnostic system of claim 1, wherein the user interface is configured to display a pulse-width modulation signal representative of the test signal.

10. A towing diagnostic system, comprising:
    a detection circuit on a towing vehicle;
    a load circuit including at least one electrical load corresponding to an electrical circuit of a towed vehicle;
    an electrical interface at the towing vehicle providing electrical communication between the load circuit and the detection circuit; and
    a user interface configured to display a plot including load information about the load circuit, wherein the plot includes electrical characteristic data measured over time, and wherein the detection circuit includes control circuitry in communication with the user interface and the load circuit, the control circuitry configured to:
        communicate a test signal to the load circuit;
        measure a response to the test signal from the load circuit;
        determine the load information based on the response to the test signal;
        communicate an output to the user interface to present the plot;
        compare the response to target response data; and
        determine compatibility of the electrical circuit based on the comparison.

11. The towing diagnostic system of claim 10, wherein the user interface is configured to display a pulse-width modulation signal representative of the test signal.

12. The towing diagnostic system of claim 11, wherein the electrical characteristic data includes an on state current through the load circuit.

13. The towing diagnostic system of claim 10, further comprising:
    a tester configured to plug into the electrical interface, wherein the load circuit is disposed in the tester.

14. The towing diagnostic system of claim 13, wherein the tester includes at least one electromagnet to simulate a trailer brake.

15. The towing diagnostic system of claim 13, wherein the tester includes at least one lighting device to simulate a trailer light.

16. The towing diagnostic system of claim 10, wherein the control circuitry is configured to communicate the compatibility to the user interface, and wherein the user interface is configured to indicate the compatibility.

17. The towing diagnostic system of claim 16, further comprising:
    a database configured to store properties of the electrical circuit of the towed vehicle, wherein the control circuitry is configured to communicate the properties of the electrical circuit of the towed vehicle in response to the electrical circuit is compatible.

18. A towing diagnostic system, comprising:
    a detection circuit on a towing vehicle;
    a load circuit including at least one electrical load corresponding to an electrical circuit of a towed vehicle;
    an electrical interface at the towing vehicle providing electrical communication between the load circuit and the detection circuit;
    a tester configured to plug into the electrical interface, wherein the load circuit is disposed in the tester; and
    a user interface configured to display a plot including load information about the load circuit, wherein the plot includes electrical characteristic data measured over time, and wherein the detection circuit includes control circuitry in communication with the user interface and the load circuit, the control circuitry configured to:
        communicate a test signal to the load circuit;
        measure a response to the test signal from the load circuit;
        determine the load information based on the response to the test signal;
        communicate an output to the user interface to present the plot;
        compare the response to target response data; and
        determine compatibility of the electrical circuit based on the comparison.

* * * * *